US008275064B2

United States Patent
Nissani (Nissensohn)

(10) Patent No.: US 8,275,064 B2
(45) Date of Patent: Sep. 25, 2012

(54) ENHANCED MIMO DETECTION METHOD AND APPARATUS

(75) Inventor: Daniel Nathan Nissani (Nissensohn), Tel Aviv (IL)

(73) Assignee: Mint Access Fund, LLC, Wilmington, DE (US)

(*) Notice: Subject to any disclaimer, the term of this patent is extended or adjusted under 35 U.S.C. 154(b) by 578 days.

(21) Appl. No.: 12/011,173

(22) Filed: Jan. 25, 2008

(65) Prior Publication Data
US 2009/0190676 A1 Jul. 30, 2009

(51) Int. Cl.
*H04L 27/00* (2006.01)
(52) U.S. Cl. .................. 375/295; 327/291
(58) Field of Classification Search ........... 375/295
See application file for complete search history.

(56) References Cited

U.S. PATENT DOCUMENTS

| 6,097,771 | A | 8/2000 | Foschini |
| 6,351,499 | B1 | 2/2002 | Paulraj et al. |
| 7,233,634 | B1 | 6/2007 | Hassell Sweatman et al. |
| 2003/0236076 | A1 | 12/2003 | Brunel |
| 2004/0047426 | A1 | 3/2004 | Nissani |
| 2006/0256888 | A1* | 11/2006 | Nissani (Nissensohn) ... 375/267 |

OTHER PUBLICATIONS

Agrell, et al., "Closest Point Search in Lattices," IEEE Transactions on Information Theory, 48(8): 2201-2214, 2002.
Gespert, et al., "From Theory to Practice: An Overview of MIMO Space-Time Coded Wireless Systems," IEEE Journal on Selected Areas in Communications, 21(3): 281-302, 2003.
Burg, et al., "VLSI Implementation of MIMO Detection Using the Sphere Decoding Algorithm," IEEE Journal of Solid-State Circuits, 40(7): 1566-1577, 2005.

* cited by examiner

*Primary Examiner* — David C. Payne
*Assistant Examiner* — Erin File

(57) ABSTRACT

A multiple-input-multiple-output (MIMO) wireless communication enhanced detection method and apparatus are proposed whereby quasi optimal link performance is achieved, at low complexity for MIMO systems including those of high dimension and those operating at very high SNR.

18 Claims, 8 Drawing Sheets

ENHANCED MIMO DETECTION METHOD AND APPARATUS

CROSS REFERENCE TO RELATED APPLICATIONS

The subject matter hereof is related to the following patent applications:

a. Nissani (Nissensohn), D. N., 'Multi Input Multi Output Wireless Communication Reception Method and Apparatus', U.S. Ser. No. 11/052,377, filed February 2005;
b. Nissani (Nissensohn), D. N., 'Multi Input Multi Output Wireless Communication Reception Method and Apparatus', U.S. Ser. No. 11/491,097, filed July 2006; and
c. Nissani (Nissensohn), D. N., 'Multi Input Multi Output Wireless Communication Reception Method and Apparatus', PCT/IL07/00919, filed July 2007;

which are incorporated herein in their entireties by reference.

STATEMENT REGARDING FEDERALLY SPONSORED RESEARCH OR DEVELOPMENT

Not Applicable

CITED REFERENCES

The following references are cited within this invention description:

[1] Gesbert, D., Shafi, M. et al., 'From Theory to Practice: An Overview of MIMO Space-Time Coded Wireless Systems', IEEE Journal on Selected Areas in Communications, April 2003
[2] Burg, A. et al., 'VLSI Implementation of MIMO Detection Using the Sphere Decoding Algorithm', IEEE Journal of Solid State Circuits, July 2005
[3] Kawai, H. et al., 'Adaptive Control of Surviving Symbol Replica Candidates in QRM-MLD for OFDM-MIMO Multiplexing', IEEE Journal on Selected Areas in Communications, June 2006
[4] Guo, Z., Nilsson, P., 'Algorithm and Implementation of the K-Best Sphere Decoder for MIMO Detection', IEEE Journal on Selected Areas in Communications, March 2006
[5] Agrell, E., Eriksson, T., et al., 'Closest Point Search in Lattices', IEEE Transactions on Information Theory, August 2002
[6] Lenstra, A. K., Lenstra, H. W., Lovasz, L., 'Factoring Polynomials with Rational Coefficients', Math. Annalen, vol. 261, 1982

BACKGROUND OF THE INVENTION

This invention relates in general to multiple-input-multiple-output (MIMO) wireless communication systems.

The governing equation of such MIMO systems is [1]

$$y = Hx + n \quad (1)$$

where, in complex base-band representation, H denotes the propagation complex channel matrix of R×L elements, with R and L the number of antenna elements at the (receiving) Right and (transmitting) Left sides respectively, where x is the transmitted complex base-band vector, and y is the received complex base-band vector distorted by the channel H and interfered by the receiver additive noise n.

The optimal solution to (1) above (e.g. [1]), of special relevance to our proposed invention, is the so called Maximum Likelihood Detection (MLD) scheme whereby the estimated transmitted vector $x_{MLD}$ is the vector which minimizes the (Euclidean) distance between the received vector y and the Channel transformed vector (H x), namely:

$$x_{MLD} = \arg\min \|y - Hx_i\|^2 \quad (2)$$

where the minimization process takes place upon all the candidate vectors $x_i$ (not to be confused with the transmission vector elements $x_j$). This scheme is known to be optimal in the sense of Symbol Error Rate (SER) vs. mean Signal to Noise Ratio (SNR) performance. However the exhaustive search MLD scheme is also known (again, [1]) to be of prohibitive complexity, the number of candidate vectors $x_i$ exponentially growing with both the dimension of x and the order of the symbol constellation; for example, the detection of a transmitted vector with M=4 sub-streams (e.g. a MIMO system comprising 4 radiating elements on each side) drawn out of 64-QAM constellation, would require $2^{6 \times 4}$ or approximately 16000000 metrics-calculations/vector, clearly prohibitive with present art computation devices technology.

Due to fore-mentioned MLD complexity some solutions to (1) consisting of simplifications to said exhaustive search method (2) have been proposed. One such popular proposed solution consists of a limited set search whereby the candidates search set is reduced to a 'sphere' of fixed or adaptive radius around the received vector y. This class of methods is sometimes appropriately named Sphere Decoding (SD for shorthand, e.g. [2]).

Still other simplified solutions to (1) have been proposed, like the QRD-M method ([3]) and the K-Best method ([4]) both consisting (like SD) of some sort of 'volume' or 'tree' exhaustive search. While substantially simplifying the full set exhaustive search as reflected in (2) above, all SD, QRD-M and K-Best however still suffer from poor, above cubic scalability (doubling H dimension multiplies the number of operations/vector by more than eight), constellation sensitivity (application of e.g. 64-QAM instead 16-QAM significantly affects complexity) and challenging Log Likelihood Ratios (LLRs) or soft decision results generation.

In the fore-cited and herein incorporated by reference cross-related patent applications a. Nissani (Nissensohn), D. N., 'Multi Input Multi Output Wireless Communication Reception Method and Apparatus', U.S. Ser. No. 11/052,377, filed February 2005.
b. Nissani (Nissensohn), D. N., 'Multi Input Multi Output Wireless Communication Reception Method and Apparatus', U.S. Ser. No. 11/491,097, filed July 2006.
c. Nissani (Nissensohn), D. N., 'Multi Input Multi Output Wireless Communication Reception Method and Apparatus', PCT/IL07/00919, filed July 2007 a fundamentally novel MIMO detection method was introduced along with its related apparatus. We hereon collectively denominate this method, described in the fore-cited Patent Applications, as Directional Lattice Descent (DLD in short). Its unique benefits include quadratic scalability (doubling H dimension multiplies complexity by approximately four), complexity insensitivity to modulating constellation, and seamless generation of LLRs or soft decision results.

In accordance with the said DLD invention the transmitted vector x of (1) above is treated as a point which belongs to a Transmission Lattice Bounded Region (e.g. [5]), said lattice informally defined as a countable infinite set of regularly spaced points in a multi-dimensional space, and said Transmission Lattice Bounded Region informally defined as a closed continuous region in this space (in typical constellations usually of hyper-cubic shape).

Still in additional accordance with the said DLD invention any noiseless received point H x of (1) above is perceived as belonging to a Reception Lattice Bounded Region, said Reception Lattice readily calculable from said Transmission Lattice by application of the channel matrix H.

Still in accordance with the said DLD invention, the MIMO reception process incurs the attempt of calculation of the MLD solution point $x_{MLD}$ of (2) above, that is a point which belongs to the Reception Lattice, which resides closest (in a Euclidean distance or other suitable metrics) to the received vector y of (1) and which is confined to the appropriate Reception Lattice Bounded Region.

In further accordance with the said DLD invention a vector detection process includes: the execution of an Initial Point Stage during which a Reception Lattice Initial Point is calculated; an iterative lattice Descent Stage during which, starting from said Reception Lattice Initial Point a possible descent is executed to sub-sequent Reception Lattice Points each calculated to reside at a smaller distance from the received vector y than its previous one, said Descent Stage terminated at a Reception Lattice Point for which no closer Reception Lattice Point to the received vector y is found (i.e. a probable minimal point); and an occasionally applied Outlier Stage during which, in cases whereby the Reception Lattice Point achieved by said Descent Stage is found to reside out of said Reception Lattice Bounded Region, another Reception Lattice Point is calculated typically by a re-conductance of said Descent Stage as above except that sub-sequent Reception Lattice Points are now constrained to the Reception Lattice Bounded Region.

The DLD method as briefly described above may be appropriately considered a discrete space equivalent of the well known gradient descent method of the 'analog world'.

It is the goal of this patent application to introduce enhancements to the said DLD method of special importance at large MIMO dimensions and/or very high operation mean SNR. We refer the diligent reader to a thorough study of said fore-cited incorporated applications.

OBJECTIVES AND ADVANTAGES OF THE INVENTION

It is the main objective of this proposed invention to introduce enhancements to the MIMO detection DLD method and corresponding apparatus of special significance at high MIMO dimensions and/or very high mean operating SNR.

It is a main benefit of this proposed invention to implement such enhancements with small increase in the DLD average complexity.

SUMMARY OF THE INVENTION

As briefly described above as well as detailed in said cross-related cited patent applications the DLD method includes a so called Descent Stage during which a supposedly minimum distance solution is arrived at.

It has been pointed out in said prior DLD patent applications that the occasional result of said Descent Stage is a false minimum lattice point. To minimize this undesirable effect preferred embodiments of the DLD invention as described thereon have used so called reduced lattice basis vectors (e.g. [5]) as lattice spanning vector sets. The use of such reduced bases have brought the probability of said false minimum events to negligible levels for systems of medium dimensions (up to say, dimension M=8) and low to high mean SNR. It has nevertheless been found by extensive simulation that the impact of this false minimum phenomenon is non-negligible for larger dimension MIMO systems (e.g. M>8) or for medium dimension MIMO systems when operated at very high mean SNR.

It is proposed in the present invention, as an enhancement to said DLD MIMO detection method, to diminish said false minimum solution event probability by: marking each Descent Stage solution; repeating the execution of said Descent Stage a number of rounds, prohibiting the arrival to said marked prior solutions, thereby forcing said Descent Stage to arrive to some different solution; selecting, at completion of said repetition, the best of said solutions.

As a further enhancement to said DLD, a method is proposed to detect (with high probability) the arrival of said Descent Stage to such false minimum lattice point, and, conversely, to detect (with high probability) the arrival of said DLD Descent Stage to a true minimum solution.

Thereby facilitating execution of said repetition of said DLD Descent Stage only for those cases whereby such probable false minimum error has occurred, and allowing halting said repetition if and when a certain Descent Stage repetition round results in a detected true minimum solution.

As detailed in said cross-related patent applications the DLD Descent Stage is carried out utilizing a pre-calculated lattice spanning vector set. It is well known (e.g. [5]), that lattices may be described by different lattice spanning vector sets. These lattice spanning vector sets may consist of different bases (i.e. minimal size spanning vector sets), and even of different reduced bases (i.e. lattice bases characterized by mutual quasi-orthogonal vectors).

It has been demonstrated by simulation that, for a specific lattice (i.e. specific channel matrix) and specific received vector y, the probability of arrival to a false minimum solution varies with the selected lattice spanning vector set.

Hence as a further enhancement to said DLD MIMO detection method, it is proposed that said DLD Descent Stage repetition rounds be executed utilizing different lattice spanning vector sets, thus further reducing the probability that a specific achieved solution be a false minimum solution.

DETAILED DESCRIPTION OF THE INVENTION

Figure 1:
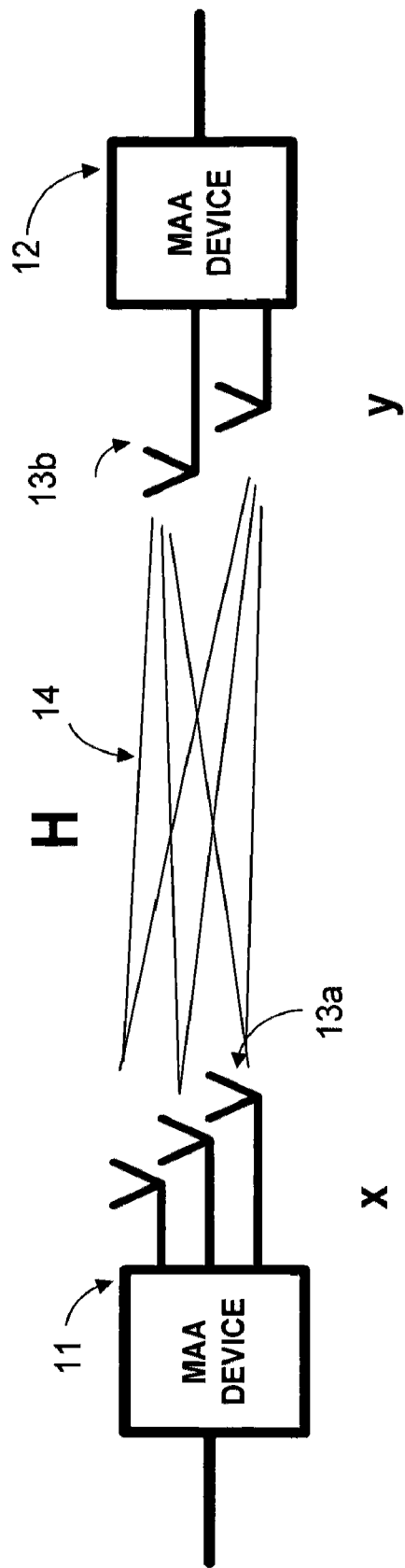
FIG. 1 describes a deployment of a MIMO transmitter device and a MIMO receiver device.

A typical wireless MIMO communication system is shown in FIG. 1. Such a system should include at least 2 communication devices, such as 11 and 12, at least one of which should include a multiple-antenna array (MAA) such as those figuratively represented by 13a with L antenna elements and 13b with R antenna elements.

Between said pair of the MIMO system devices a propagation channel H, such as 14, characterizing the propagation effects during signal transmission from 11 to 12 as shown in FIG. 1, may be defined.

A wireless MIMO system such as that depicted in FIG. 1 can be described by its governing Equation (1) above. The optimal (MLD) solution of this system is given by Equation (2) above. A computationally efficient and quasi-optimal solution to (1) above has been proposed, in said herein incorporated cross-related patent applications; said proposed invention models the MIMO detection problem as that of finding the closest point in a lattice to a given received vector y. This method has been herein denoted as DLD. An essential part of said DLD invention consists of a so called Descent Stage whereby lattice points are sequentially traversed so that each resides at a lesser distance from said received vector y than its predecessor lattice point.

Due to their relevance to the present invention, basic lattice concepts as well as concise descriptions of the said DLD method Descent Stage and Outlier Stage are described in the following paragraphs. For further and full details the reader is referred to the cross-cited, herein incorporated by reference patent applications.

Figure 2:
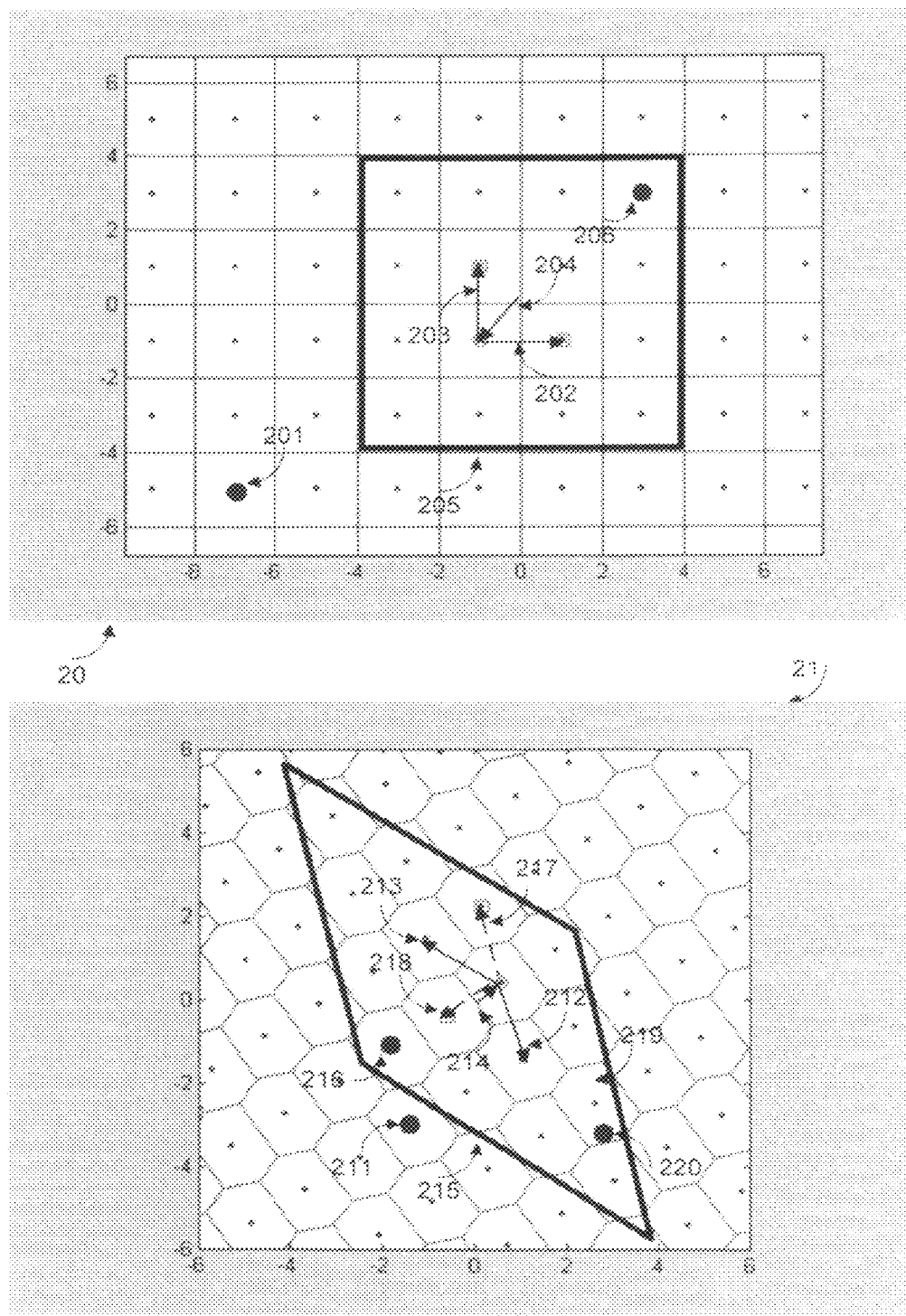
FIG. 2 describes Transmission and Reception Lattice entities associated with said DLD MIMO detection method.

FIG. 2 presents lattice related entities related to the exposition of the present invention. A Transmission Lattice suitable for the description of a simple (M=) 2 sub-streams, 4-PAM (Pulse Amplitude Modulation) constellation is depicted in 20 of FIG. 2. Generalization to M>2 sub-streams and to more common complex constellations such as QPSK, 16-QAM, 64-QAM, etc., is straightforward and could be easily devised by anyone reasonably skilled in the art. Such Transmission Lattices are essentially a countable infinite set of regularly spaced points in a multi-dimensional space.

In a typical MIMO communication system, transmission constellations are confined to a Bounded Region 205 of a Transmission Lattice 20. Other constellations, such as QPSK, 64-QAM, etc. result in different Bounded Regions 205. A constellation vector s 206 can then be selected for transmission. Such Transmission Lattice point s 206 can be described as a linear combination of Transmission Lattice basis (spanning) vectors $a_1$ 202 and $a_2$ 203, translated by an immaterial vector such as $a_0$ 204, all of 20.

As can be observed, the Reception Lattice 21 of FIG. 2 is affected, by the scaling and rotation effects, caused by the random channel matrix H as stated in Equation (1) above, on the Transmission Lattice 20 of same Figure. Any point 211 of the Reception Lattice 21 can similarly be expressed as a linear combination of rotated and scaled (spanning) basis vectors $b_1$ 212 and $b_2$ 213 of 21 followed by translation by the rotated-scaled translation vector $b_0$ 214.

It can be further observed from 21 of FIG. 2 that the Basis Vectors $b_1$ 212 and $b_2$ 213 are no more orthogonal (in contrast to $a_1$ 202 and a2 203 of 20, which are shown to be orthogonal by virtue of the use of popular constellations and proper basis choice), and that the Bounded Region 215 of the Reception Lattice 21 has been also scaled and rotated.

It should be still further observed that the transmitted constellation vector s 206 of 20 has been transformed in the (noiseless) received constellation vector p 216 of 21, residing inside the Reception Lattice Bounded Region.

The $R^M$ space containing the Reception Lattice 21 can be separated into disjoint decision regions (commonly called Voronoi regions), each decision region including all the (real) points that are closer (in a Euclidean distance sense) to a specified lattice point than to any other lattice point, one of such Voronoi regions indicated by 219. It is the main function of an optimal (MLD) MIMO receiver to associate any real and noisy received vector y such as 220 of 21 to the closest Reception Lattice point, that is to the lattice point at the 'center' of the Voronoi region to which said received vector 220 belongs to.

It has been convenient to describe the Reception Lattice 21 by means of column Basis Vectors $c_1$ 217 and $c_2$ 218 which are more mutually orthogonal to each other than the original Reception Lattice basis vectors $b_1$ 212 and $b_2$ 213 as described by the Reception Lattice generator matrix B as defined above. It should be noted that many different such sets, of so called reduced basis vectors, usually exist (e.g. [5]). Methods for efficient calculation of such reduced bases are well known such as described in [6].

It has been a main idea of the DLD cross-related invention to solve the MIMO detection problem by means of a Directional Lattice Descent process (hence the method denotation—DLD), a discrete space analogy to the well known Gradient Descent method. This process incurs the selection of an Initial Lattice Point, followed by a lattice Descent Stage whereby subsequent 'adjacent' lattice points are selected if their (Euclidean) distance from the received vector y 220 is smaller than the distance of the previous lattice point from said received vector, and whereby said Descent Stage is terminated whenever the attempt to identify a closer lattice point fails, thereby indicating the probable achievement of a minimum distance lattice point.

Figure 3:
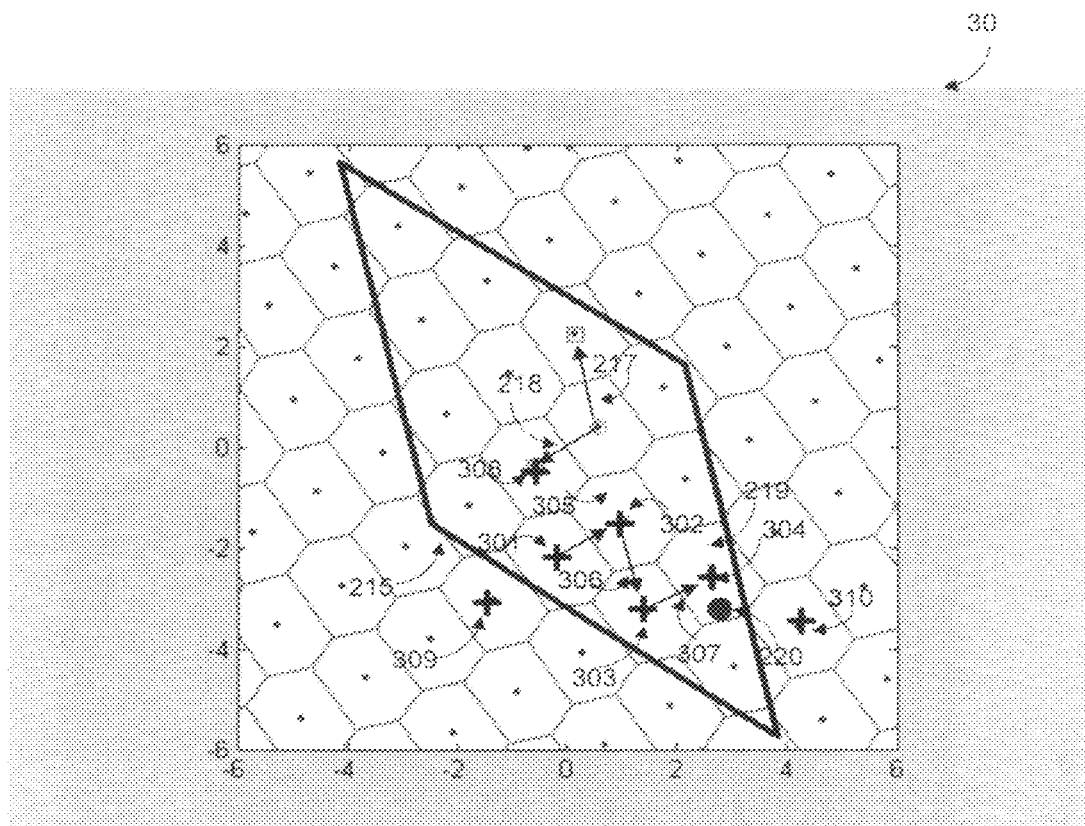
FIG. 3 shows pictorial depictions of the DLD method Descent Stage.
Figure 3:
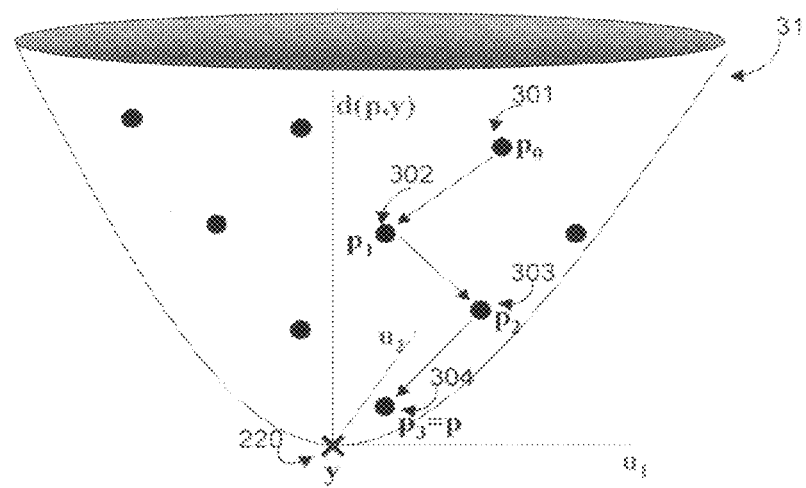

In 30 of FIG. 3 the Reception Lattice entities, essential for the exposition of the fore mentioned lattice Descent Stage, are depicted. Several entities, introduced in 21 of FIG. 2 are repeated herein, for the sake of clarity.

In accordance with a possible embodiment of the DLD detection method, it is assumed that an arbitrary initial lattice point, such as $p_0$ 301 of 30 has been selected at the initiation of the Descent Stage. This initial lattice point $p_0$ 301 is the current hypothetical result of the lattice Descent Stage.

The distance between said initial lattice point 301 and the received vector y 220 is calculated. Following said calculation, candidate lattice points, each such candidate derived from the previous (initial in the first step) lattice point by shifting away from it by a single unit in each of both (positive and negative) directions of the (reduced) basis vectors $c_1$ 217 and $c_2$ 218 are calculated. Examples of such candidate lattice points, 'adjacent' to the initial lattice point 301 in the described way, are 308, 309, and 302 of 30.

A candidate subsequent lattice point is selected, 302 in this example, with the smallest distance (of all considered candidates) from the received vector y 220.

The lattice point 302 becomes effectively a new hypothetical result of the lattice Descent Stage and the process is repeated, sequentially selecting, in our example, lattice points 303 and 304 corresponding to the unit direction vectors 306 and 307 of 30. The lattice Descent Stage is then terminated, since, following arrival to 304 no unit direction vector yields a candidate lattice point with smaller distance to y 220 than 304 itself, indicating the arrival to a supposedly lattice minimum solution.

For the sake of clear and intuitive exposition this lattice Descent Stage process is figuratively and self-explanatorily described again in 31 of FIG. 3; detailed description is omitted for the sake of brevity.

It has been a second main idea of the said DLD cross-related invention to solve the MIMO detection problem by means of execution of an Outlier Stage during the occasional (but nevertheless non-negligible) cases whereby said lattice descent minimal point, the said result of said lattice Descent Stage, is found to reside out of the Reception Lattice Bounded Region 215, such as 310, both of 30.

The correct constrained Maximum Likelihood Decision in such cases would be a Lattice Point closest to the received vector y but residing within the Bounded Region 215. Such a point, in our example, would be 304.

In a preferred embodiment of the lattice Outlier Stage of the DLD cross-related method a processing similar to the lattice Descent Stage as described above is executed, namely, a distance from the received vector y 220 to a selected Initial Lattice Point is calculated, said Initial Lattice Point selected so that it resides inside said Lattice Bounded Region 215; then subsequent 'adjacent' candidate lattice points are calculated; then their distances from said received vector y 220 are evaluated and compared with that of the current 'best' lattice point, and a new lattice point is selected if its distance from the received vector y 220 is smaller than that of the current lattice point and if it resides inside the Lattice Bounded Region 215. We denote this Outlier Stage method by lattice constrained descent. The reader is referred to said cross-related patent applications for further and full details.

Hence, minima points are arrived at during both the regular Descent Stage operation as well as during the occasional Outlier Stage. Such a said lattice descent minimal point can be a true minimum point, i.e. a point such that no other lattice point is closer to the received vector y 220 than said minimum point, or it may turn out to be a false minimum point, that is a point that, because of imperfect mutual orthogonality of the direction vectors utilized during said Descent Stage (for example the relatively non-orthogonal original basis vectors $b_1$ and $b_2$), results in termination of said Descent Stage (or said Outlier Stage) in some lattice point other than the true minimum point.

It can be shown by simulation that the use of reduced bases, such as $c_1$ 217 and $c_2$ 218 of 30, decreases the probability of false minimum events to negligible values for MIMO systems of medium dimension (up to, say, M=8) operating at reasonable mean SNR.

MIMO systems with medium dimension M operated at very high mean SNR, or MIMO systems of higher dimension (i.e. M>8) exhibit non-negligible false minimum solutions and have provided the main motivation for the presently proposed invention.

Figure 4:
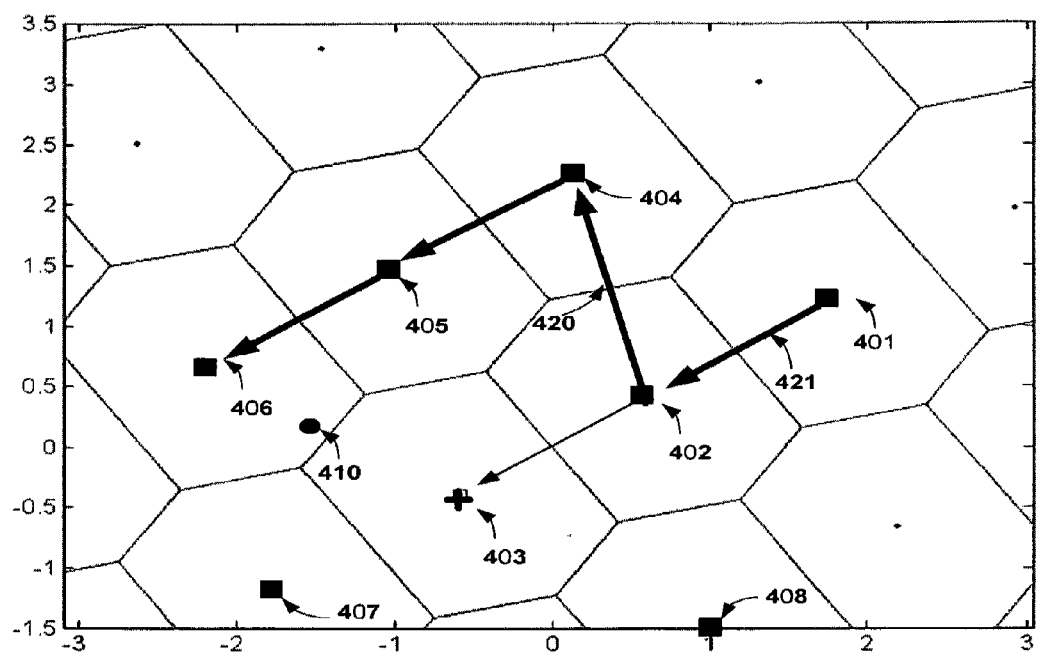
FIG. 4 describes a DLD Descent Stage false minimum event and a 'mark, evade and repeat' trace.

Refer to FIG. 4 where a false minimum event, as well as a main idea of the present proposed invention are shown. A Reception Lattice structure is shown including denoted lattice points 401, 402 . . . to 408. The Reception Lattice points may be represented by means of linear combinations of a set of basis vectors, such as $c_1$ 420 and $c_2$ 421 of FIG. 4. For the sake of clarity the Reception Lattice Bounded Region has been omitted. Assume that point 410 is a noisy received vector. An MLD detector should detect said vector as lattice point 406 since this is its closest lattice point. Assume further that 401 has been calculated as our Initial Point and that we now either enter the Descent Stage, in the regular course of events, or conduct a constrained descent process as part of an exceptional Outlier Stage activation.

It is easy to see that following the logical steps of lattice descent will lead us to decide upon lattice point 403 as our solution. All adjacent points to 403 (in the known sense of one basis vector shift from our current point) such as 405, 402, 407, etc. reside at a distance from received point 410 larger than that of lattice point 403 itself. Since 403 is not the minimum distance solution (406 is) we experience a false minimum event.

In a possible embodiment of the present invention arrived-at solutions are marked, the lattice descent process is repeated a number of times, evading previously marked lattice points, and the solution which is best (i.e. with a smallest distance from received vector) is selected, out of all marked past solutions, as our solution.

To demonstrate the operation of this proposed mechanism in the present example, we arrive to lattice point 403 and mark it (said marking is denoted by a 'cross' mark in 403 of FIG. 4); we then repeat lattice descent, starting from 401 once again. This time, once we arrive to lattice point 402 we cannot choose 403 since it has been marked at the end of our prior lattice descent cycle. It is easy to see that lattice point 404 is now the closest to our received point 410 (that is closer than 401, 403 and 408 adjacent lattice points) hence it is selected as the next point; from thereon lattice descent proceeds naturally to 405 and finally to 406. Upon selection of best solution between marked 403 and 406, lattice point 406 wins and becomes our selected final (and true) solution.

It can be shown by simulation that such a scheme as described above may solve the great majority of false minima events. It comes however with a cost tag, since this modified DLD solution now requires the repetition of the lattice descent process a number of times.

It is a second main idea of this proposed invention to introduce a mechanism which allows to discriminate amongst erroneous and correct solutions with high probability. Such a mechanism will allow to initiate a lattice descent process repetition for only the cases whereby an erroneous solution has been detected (with high probability) thus significantly reducing the complexity impact of applying the repeated lattice descent process as outlined above.

We denote the (squared) distance between a calculated solution, such as 403 or 406 of FIG. 4 and the received vector 410 as $d_a$. It would then seem intuitively plausible that the larger $d_a$ is, relative to the (squared) norm of the lattice basis vectors $c_i$ (or some suitable function thereof) the highest the probability that our solution is incorrect, and, conversely, that the smaller $d_a$ is the greater the probability of a correct decision. This indeed can be proved to be true by simulation. Several possible functions of $c_i$ can be utilized for this purpose, such as $$d=\min\|c_i\|^2+b \tag{3a}$$

or $$d=\text{mean}\|c_i\|^2+b \tag{3b}$$

where the min (or mean) operator is applied over all basis vectors $c_i$ and where b is some appropriate scalar.

Figure 5:
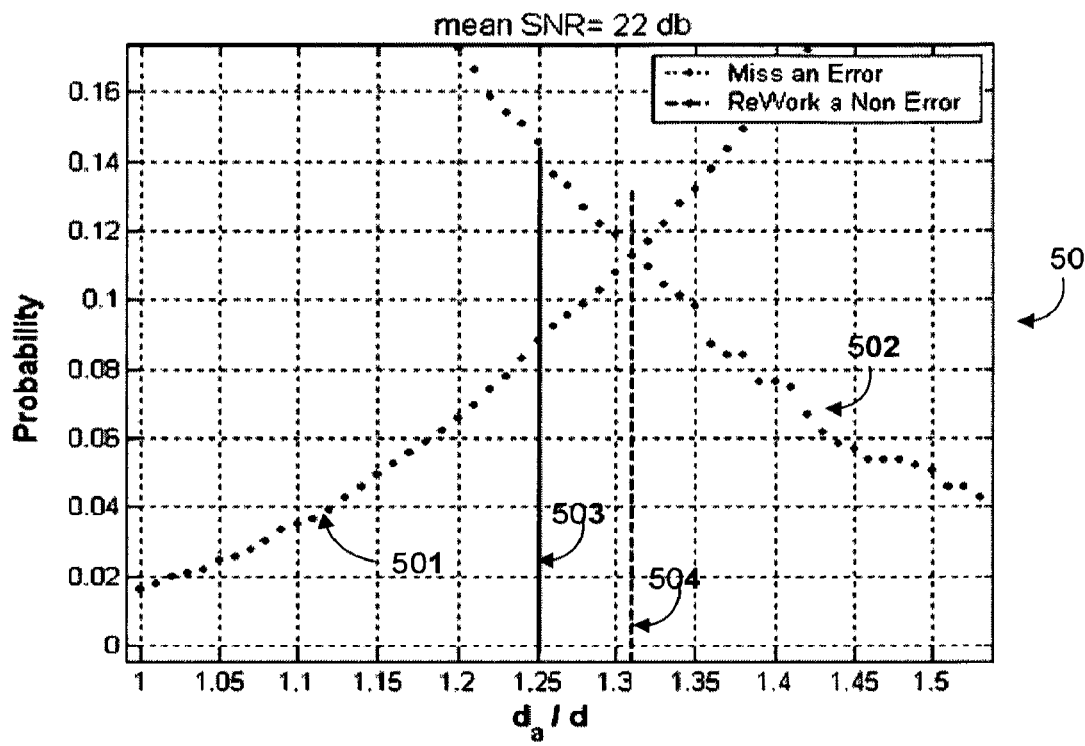
FIG. 5 describes probability plots of 'false minimum error miss' and 'true minimum rework'.
Figure 5:
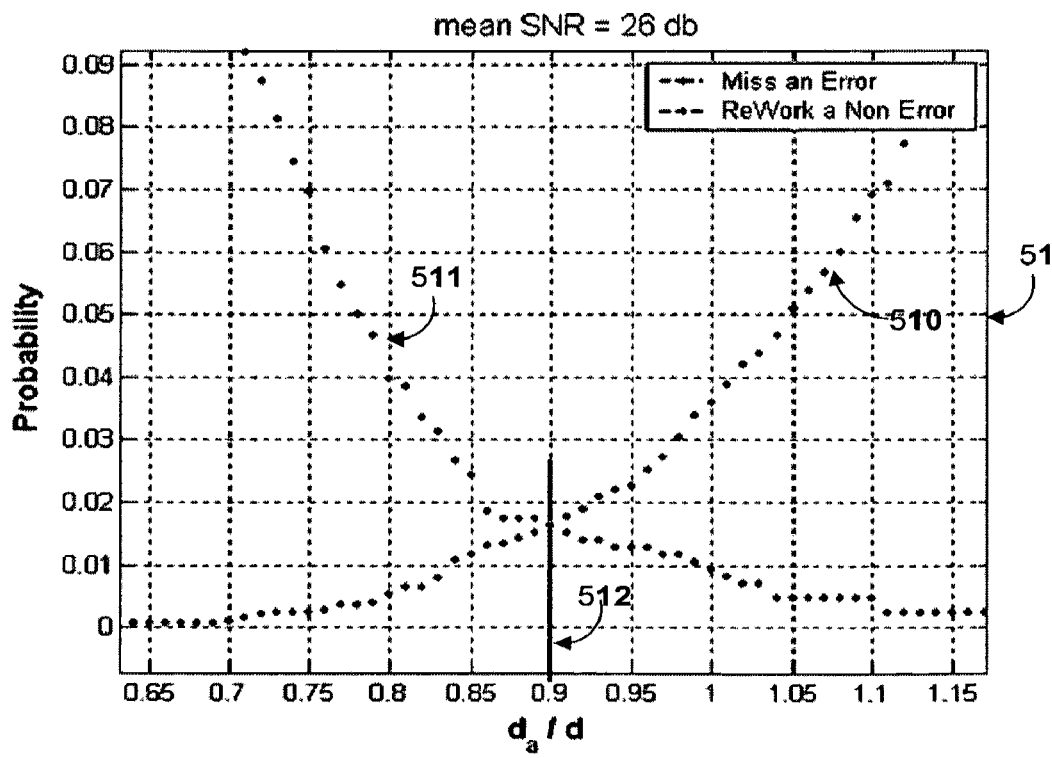

We refer now to FIG. 5. It shows 'Miss an Error' (501 of 50, 510 of 51) and 'Re-Work a Non-Error' (502 of 50, 511 of 51) events probability plots for a high dimension MIMO system (M=10) with 64-QAM constellation, at mean SNR of 22 db (50 of FIG. 5) and 26 db (51 of FIG. 5). In calculating these probabilities we have used the reference function d as defined by Equation 3a above with b=3. Utilizing such plots, event detection thresholds can be set to achieve a suitable trade-off between 'Miss an Error' probability and 'Re-Work a Non-Error' probability as desired, that is a trade-off between complexity and performance.

For example, in 50 of FIG. 5 we observe that, for a mean SNR of 22 db, setting our threshold to $(d_a/d)=1.25$ as indicated by 503 will (approximately) result in a 'Miss an Error' probability of 0.09 and a 'Re-Work a Non-Error' probability of 0.14 while setting the threshold to 1.31 as indicated by 504 will result in similar 'Miss an Error' and 'Re-Work a Non-Error' probabilities, both at 0.11.

Similarly, in 51 of FIG. 5 we note that setting our threshold at $(d_a/d)=0.9$, as indicated by 512 will result in similar 'Miss an Error' and 'Re-Work a Non-Error' probabilities, both at 0.017; obviously, the higher the mean SNR the lower are our penalties in performance (missing a decision error) and in complexity (reworking a correct decision).

In a preferred embodiment of this proposed invention said probability plots can be pre-calculated and corresponding thresholds can be pre-set for each desired MIMO dimension, constellation and mean SNR; this can be done by means of simulation, by any one reasonably skilled in the art, and details are omitted.

In a preferred embodiment of this proposed invention, a lattice descent process is conducted, with a corresponding arrival to a prospective lattice point solution such as 403 of FIG. 4; this is followed by the calculation of the distance $d_a$, between lattice point 403 and received vector 410. A decision is then made, utilizing an appropriate pre-calculated threshold, such as 512 of FIG. 5 on whether to repeat the lattice descent cycle (with some small probability of unnecessary re-work) or, alternatively, to accept 403 as a correct decision (with some small probability of missing an error). As can be demonstrated by simulation, this can save a major amount of computation (relative to a mere uneducated repetition of lattice descent cycles) at the expense of a small performance penalty.

We have so far described the execution of said lattice descent process whereby a single (preferably reduced) basis vector set, such as 420 $c_1$ and 421 $c_2$, both of FIG. 4, is utilized. It is well known (e.g.[5]) that for a given lattice, there usually exist many base sets (and many reduced base sets as well). In a possible embodiment of the current invention, said lattice descent round repetition can be done utilizing same basis vectors (such as $c_i$) on each round.

In a preferred embodiment of the proposed invention different basis vector sets can be used on each or some of said repetition rounds. It can be shown by simulation that, for a given lattice (i.e. a given channel matrix) and a given received vector, the probability to arrive at a false minimum solution significantly differs for different selected base vectors sets; hence utilization of a sequence of lattice base vector sets can reduce the number of lattice descent rounds required to arrive to a non-erroneous solution. Said different basis vector sets can be pre-calculated and pre-stored or can preferably be calculated ad-hoc on an 'as needed' basis, since in the great majority of received vectors just only one such basis set would be required. Means for generation of such said different bases or different reduced bases are well known to experts reasonably skilled in the art, and will not be described herein.

Figure 6:
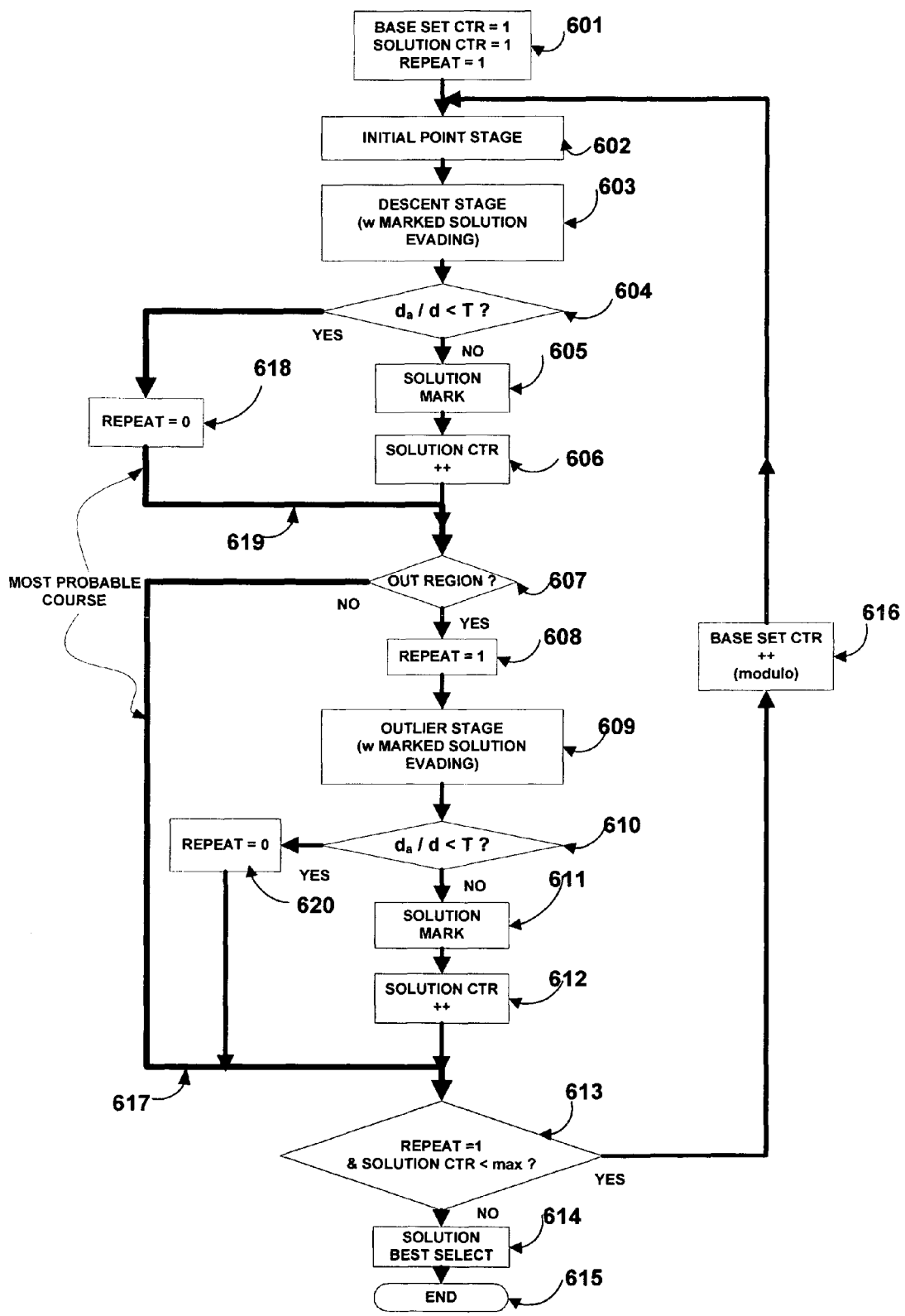
FIG. 6 describes a simplified flowchart of the proposed enhanced DLD method.

We refer now to FIG. 6 which depicts a simplified flowchart of a preferred embodiment of this enhanced DLD proposed invention. In 601 of FIG. 6 counters and flags, essential to this preferred embodiment are initialized upon arrival of a new received vector. These include: a base set counter; a solution counter; and a repeat flag. The base set counter indicates which basis vectors set will serve during execution of the fore-mentioned Initial Point, Descent and (occasional) Outlier Stages; the number of different base sets could typically range from 1 to 5; the bases set counter runs modulo-wise, that is upon arrival to last set it resets to first set. The solution counter counts the number of calculated and marked solutions, up to a pre-defined maximum number. The repeat flag is used to indicate if a new round of solution calculation should, or should not, be executed.

The Initial Point Stage 602 of FIG. 6 calculates the lattice Initial Point as described in detail in said DLD cross-related patent applications herein incorporated by reference, using the currently defined basis set.

The Descent Stage 603 of FIG. 6 executes directional lattice descent as described above and in said DLD cross-related patent applications, the only difference being, as has been explained in the context of FIG. 4, that past marked solutions are evaded, that is are prohibited from being selected again as solution to said Descent Stage, thus forcing a new different solution to be achieved.

In 604 of FIG. 6 the normalized distance ($d_a/d$) of the current solution to the received vector is compared with a pre-defined threshold T, as has been described in the context of FIG. 5 above, and a decision is made whether a new round is not required (i.e. ($d_a/d$)<T, as is the most probable case) or whether a new solution calculation round would be required (i.e. ($d_a/d$)>T, the improbable case).

If the distance of the current solution to the received vector is large (i.e. ($d_a/d$)>T) then this solution is marked as a probable error in 605 and the marked solution counter is incremented in 606, both of FIG. 6. If on the other hand the distance of the current solution to the received vector is small (i.e. ($d_a/d$)<T) then the repeat flag is reset in 618 of FIG. 6 since (unless this solution turns to require the Outlier Stage activation as will be presently described) this solution is probably correct and no more solutions calculation is required; the process then flows through route 619, the most probable course.

In both cases the arrived at solution is tested in 607 of FIG. 6 whether it belongs or not to the Lattice Bounded Region 215 of FIG. 2, as described above and in said cross-related patent applications. If it belongs (as it will with high probability) the process flows through the most probable trace 617. If it does not, then: the repeat flag is set again in 608; the Outlier Stage is executed in 609, as described above and, in detail in said cross-related patent applications (except that marked solutions are again evaded as described above in the context of said Descent Stage); a test of the current solution correctness is carried out in 610 and the repeat flag is reset in 620 if the solution is decided to be correct, similar to the test and flag reset conducted in 604 and 618 respectively as described above; if on the other hand the solution is decided wrong (in 610 of FIG. 6) then the current solution is marked and the solution counter is incremented in 611 and 612, in full analogy to 605 and 606 as described above.

In any case the process flow arrives at test 613 of FIG. 6; if both the repeat flag is set and the number of current accumulated solutions is below a pre-defined maximum then a new round is executed: the base set counter is incremented (modulo the maximum number of basis vectors sets) in 616, and a new solution round recommences in 602.

If on the other hand either an additional solution round is not required (repeat flag reset) or we have arrived at the maximum pre-defined number of marked solutions, then the best solution of all (best in the sense of smallest distance to the received vector) is selected in 614. This best solution selection is required mainly for the cases whereby in-spite a full sequence of rounds no solution has been found which satisfies the correctness criterion ($d_a/d$)<T as per 604 or 610 above. In accordance with our preferred embodiment of the proposed enhanced DLD invention, once the best solution is selected the enhanced DLD scheme completes the current received vector processing in 615 of FIG. 6 and is ready to process a new received MIMO vector.

In said preferred embodiment of the present invention the said outlier events are being processed by a specialized processing stage denominated Outlier Stage as shown in 609 of FIG. 6.

In still other possible embodiment of this invention the said specialized Outlier Stage maybe not implemented, and detected outlier events may be processed simply by marking (outlier lattice points), repeating and evading cycles as described above.

Figure 7:
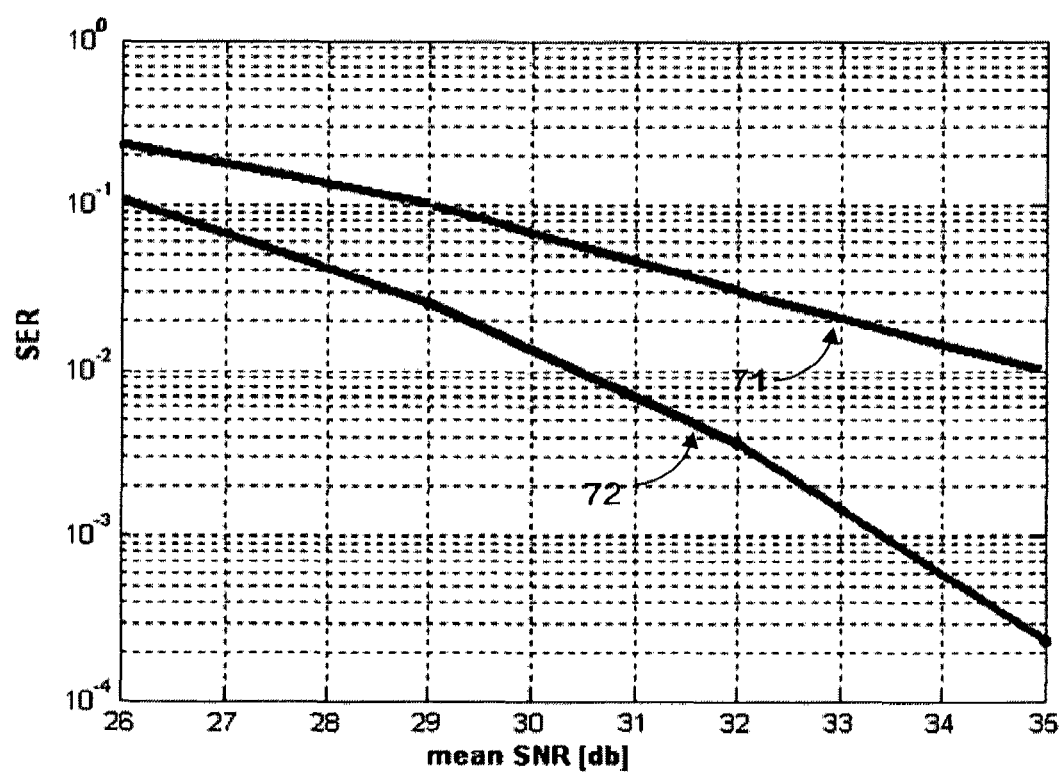
FIG. 7 shows simulated link performance results of a particular embodiment of the present invention.
Figure 8:
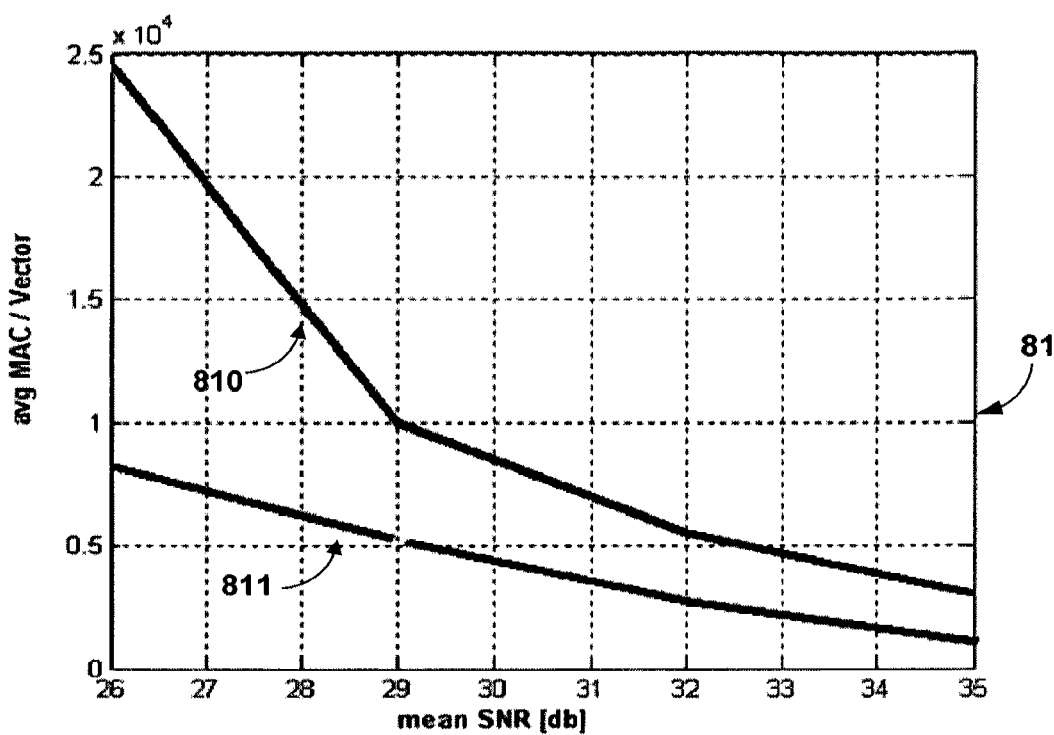
FIG. 8 shows simulated complexity results of a particular embodiment of the present invention.
Figure 8:
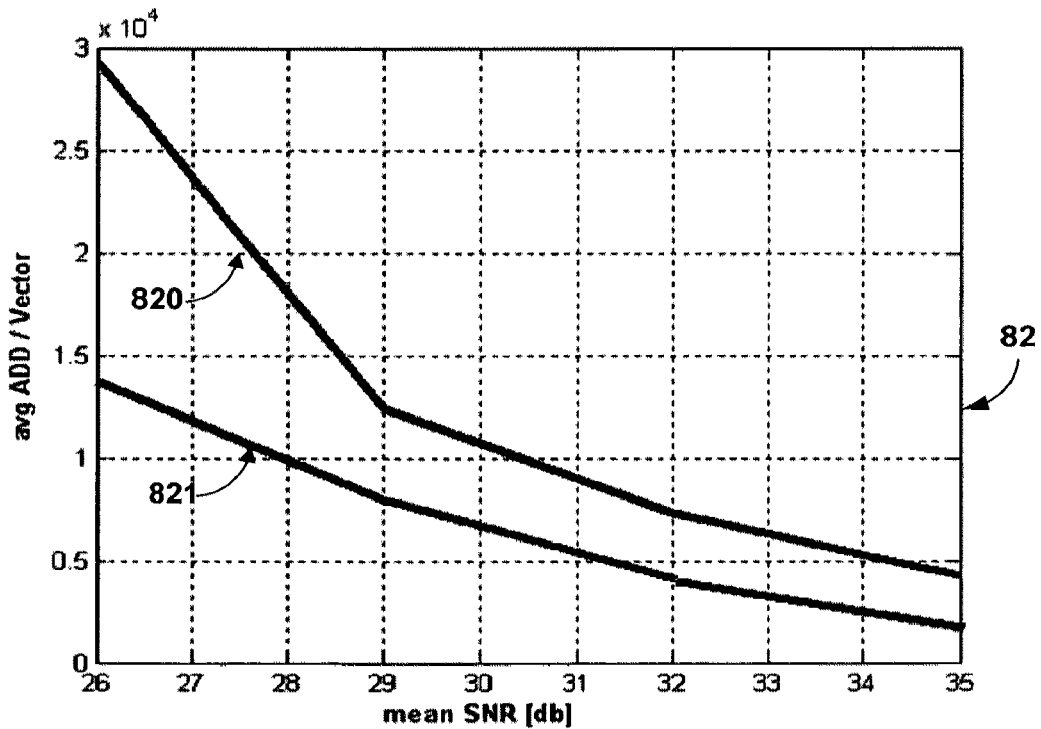

Simulation results for a MIMO system implemented in accordance with a preferred embodiment of this enhanced DLD proposed invention are shown next, compared with results for a MIMO system, solved by 'plain' DLD, which does not include any of fore-detailed enhancements. In both cases the base-band simulation model included: Rayleigh i.i.d channel matrix elements; perfect channel and mean SNR estimates; and perfect carrier frequency, vector timing and received power acquisition. Results for a relatively high MIMO dimension (M=10) configuration with 64-QAM constellation are shown. The results were simulated for several mean SNR points, ranging from 26 db to 35 db. FIG. 7 shows comparative SER results; FIG. 8 shows comparative complexity (average MAC/Vector, ADD/Vector) results.

FIG. 7 describes the Symbol Error Rate (SER) performance of a preferred embodiment of the proposed invention, 72 of FIG. 7, compared to SER, 71 of FIG. 7, of a DLD scheme which does not incorporate any of the enhancements described in detail in this Patent Application. The significant SER performance improve achieved can be appreciated. For example, at 35 db the DLD scheme which does not incorporated any of the herein introduced enhancements yields SER=$10^{-2}$, while the corresponding SER of an enhanced DLD, implemented in accordance with a preferred embodiment of this invention, achieves SER=$2\times10^{-4}$, an improve factor of 50.

Said significant performance improve is achieved at a relatively modest complexity cost, as can be observed in FIG. 8. In 81 of FIG. 8 the average number of MAC operations per MIMO vector are shown for a MIMO system not incorporating any of the DLD enhancements as detailed herein (811) and for a MIMO system implemented in accordance with a preferred embodiment of this proposed invention (810). At say, mean SNR=35 db, the number of average MAC/Vector grows from approximately 1200 to 2750. Similarly in 82 of FIG. 8 the average number of ADD operations per MIMO vector are shown for a MIMO system not incorporating any of the DLD enhancements as detailed herein (821) and for a MIMO system implemented in accordance with a preferred embodiment of this proposed invention (820). Again at 35 db, the number of average ADD/Vector grows from 2000 to 4000.

In said herein incorporated cross-referenced patent applications the DLD invention has been shown to: be able to seamlessly generate LLRs (such as bit-LLRs); be able to efficiently deal with time varying channels; be able to operate with norms different than Euclidean; be applicable to systems which integrate MIMO and space-time block coding (i.e. joint MIMO-STBC systems); and be applicable to systems with channel state information (CSI) available also at transmission side. It should be readily obvious to anybody reasonably skilled in these arts that none of the DLD enhancements presented in this proposed invention prevents or impair the operation and/or application of any of said features and environments. Details are omitted for the sake of brevity.

In said herein incorporated cross-referenced patent applications an apparatus incorporating a preferred embodiment of the DLD MIMO detector invention has been described in detail. Such apparatus, as described therein, includes amongst other entities, an Initial Point Stage processor, a Descent Stage processor, an Outlier Stage processor and an optional LLR Stage processor. The modifications required in order to convert a said DLD apparatus to an enhanced DLD apparatus thus incorporating part or all of the herein proposed DLD enhancements are simple and small, and could be devised in detail by anyone reasonably skilled in the art. Hence details are omitted for the sake of brevity.

What is claimed is:

1. A method comprising:
   receiving a signal vector at a MIMO communications system;
   traversing, by the MIMO communication system, a reception lattice two or more times to mark a plurality of lattice points of the reception lattice, wherein each traversal of the reception lattice marks a lattice point that is closer to the received signal vector than a candidate set of neighboring lattice points, wherein the candidate set of neighboring lattice points does not include any marked lattice points;
   selecting, by the MIMO communication system, a selected lattice point, from the marked lattice points, that is closest to the received signal vector; and
   decoding, by the MIMO communication system, the received signal vector using the selected lattice point.

2. The method of claim 1, further comprising:
   determining the reception lattice in accordance with an estimated channel matrix, a predetermined transmitted signal constellation, and a predetermined number of data sub-streams.

3. The method of claim 2, wherein said decoding includes determining a transmitted signal vector based on the selected lattice point and the predetermined transmitted signal constellation.

4. The method of claim 1, further comprising:
   determining, based on the received signal vector, an initial lattice point;
   wherein said traversing begins from the initial lattice point.

5. The method of claim 1, further comprising:
   identifying individual ones of the marked lattice points as corresponding to a detection error or to a detected solution.

6. The method of claim 5, wherein said identifying includes comparing a distance between the individual ones of the marked lattice points and the received signal vector to a threshold.

7. The method of claim 6, further comprising:
   determining to repeat said traversing based on all of the marked lattice points being identified as corresponding to detection errors.

8. A MIMO communication system, comprising:
   an antenna configured to receive a signal vector; and
   one or more processors configured to perform operations comprising:
   traversing a reception lattice two or more times to mark a plurality of lattice points of the reception lattice, wherein each traversal of the reception lattice marks a lattice point that is closer to the received signal vector than a candidate set of neighboring lattice points, wherein the candidate set of neighboring lattice points does not include any marked lattice points;
   selecting a particular lattice point, from the marked lattice points, that is closest to the received signal vector; and
   decoding the received signal vector using the selected particular lattice point.

9. The MIMO communication system of claim 8, wherein the operations further comprise:
   determining the reception lattice in accordance with an estimated channel matrix, a predetermined transmitted signal constellation, and a predetermined number of data sub-streams.

10. The MIMO communication system of claim 9, wherein the decoding includes determining a transmitted signal vector based on the selected lattice point and the predetermined transmitted signal constellation.

11. The MIMO communication system of claim 8, wherein the operations further comprise:
   determining, based on the received signal vector, an initial lattice point;
   wherein said traversing begins from the initial lattice point.

12. The MIMO communication system of claim 8, wherein the operations further comprise:
   identifying individual ones of the marked lattice points as corresponding to a detection error or to a detected solution.

13. The MIMO communication system of claim 12, wherein the identifying includes comparing a distance between the individual ones of the marked lattice points and the received signal vector to a threshold.

14. The method of claim 13, wherein the operations further comprise:
   determining to repeat the traversing based on all of the marked lattice points being identified as corresponding to detection errors.

15. The MIMO communication system of claim 8, wherein the one or more processors comprise:
   a first processor configured for determining the reception lattice in accordance with an estimated channel matrix, a predetermined transmitted signal constellation, and a predetermined number of data sub-streams.

16. The MIMO communication system of claim 15, wherein the one or more processors further comprise:
   a second processor configured to perform the traversing.

17. The MIMO communication system of claim 16, wherein the second processor is further configured to perform the selecting and the decoding.

18. An apparatus for detecting a transmitted signal vector, comprising:
   means for receiving a signal vector;
   means for traversing a reception lattice two or more times to mark a plurality of lattice points of the reception lattice, wherein each traversal of the reception lattice marks a lattice point that is closer to the received signal vector than a candidate set of neighboring lattice points, wherein the candidate set of neighboring lattice points does not include any marked lattice points;
   means for selecting a particular lattice point, from the marked lattice points, that is closest to the received signal vector; and
   means for decoding the received signal vector using the selected particular lattice point.

* * * * *

UNITED STATES PATENT AND TRADEMARK OFFICE
CERTIFICATE OF CORRECTION

PATENT NO. : 8,275,064 B2
APPLICATION NO. : 12/011173
DATED : September 25, 2012
INVENTOR(S) : Nissani It is certified that error appears in the above-identified patent and that said Letters Patent is hereby corrected as shown below:

In the Specification

In Column 1, Line 49, delete "1982" and insert -- 1982. --, therefor.

In Column 2, Line 49, delete "2007" and insert -- 2007, --, therefor.

In Column 3, Line 16, delete "sub-sequent" and insert -- subsequent --, therefor.

In Column 5, Line 53, delete "a2" and insert -- $a_2$ --, therefor.

In the Claims

In Column 13, Line 20, in Claim 14, delete "method" and insert -- MIMO communication system --, therefor.

Signed and Sealed this
Twentieth Day of August, 2013

Teresa Stanek Rea
*Acting Director of the United States Patent and Trademark Office*